(12) United States Patent
Hu

(10) Patent No.: US 9,130,448 B2
(45) Date of Patent: Sep. 8, 2015

(54) CONTROL ARRANGEMENT AND METHOD FOR REGULATING THE OUTPUT VOLTAGE OF A DC SOURCE POWER CONVERTER CONNECTED TO A MULTI-SOURCE DC SYSTEM

(75) Inventor: Lihua Hu, Rugby (GB)

(73) Assignee: GE ENERGY POWER CONVERSION TECHNOLOGY LTD. (GB)

( * ) Notice: Subject to any disclaimer, the term of this patent is extended or adjusted under 35 U.S.C. 154(b) by 10 days.

(21) Appl. No.: 13/984,351

(22) PCT Filed: Feb. 7, 2012

(86) PCT No.: PCT/EP2012/052003
§ 371 (c)(1),
(2), (4) Date: Aug. 8, 2013

(87) PCT Pub. No.: WO2012/107423
PCT Pub. Date: Aug. 16, 2012

(65) Prior Publication Data
US 2013/0314959 A1    Nov. 28, 2013

(30) Foreign Application Priority Data
Feb. 8, 2011   (EP) ..................................... 11000984

(51) Int. Cl.
*H02M 5/42*     (2006.01)
*H02M 7/02*     (2006.01)
(Continued)

(52) U.S. Cl.
CPC .............. *H02M 7/02* (2013.01); *H02M 7/1626* (2013.01); *H02J 3/36* (2013.01); *Y02E 60/60* (2013.01)

(58) Field of Classification Search
USPC ........ 363/35, 34, 84; 323/222, 234, 271, 282, 323/283, 284, 285
See application file for complete search history.

(56) References Cited

U.S. PATENT DOCUMENTS

2004/0257271 A1   12/2004   Jacobson
2005/0194952 A1*   9/2005   Carpenter et al. ............ 323/283
(Continued)

FOREIGN PATENT DOCUMENTS

CN         101753022 A        6/2010

OTHER PUBLICATIONS

PCT Search Report and Written Opinion from corresponding PCT Application No. PCT/EP2012/052003, Dated Mar. 22, 2012.
(Continued)

*Primary Examiner* — Nguyen Tran
(74) *Attorney, Agent, or Firm* — GE Global Patent Operation; Catherine J. Toppin

(57) ABSTRACT

A converter control arrangement for regulating the output voltage of a dc source power converter connecting an ac system to a HVDC system to enable dc electrical power to be supplied from the ac system to the HVDC system comprises a dynamic droop control device including first and second droop controllers in which the droop rate of the second droop controller is greater than the droop rate of the first droop controller. The converter control arrangement comprises a voltage regulator for regulating the output voltage of the dc source power converter by comparing an output voltage value with a target voltage value derived by combining a reference voltage value and a droop voltage value provided by the dynamic droop control device. The reference current value is the desired output current value of the dc source power converter and defines, in combination with the reference voltage value, a target operating point.

13 Claims, 3 Drawing Sheets

(51) Int. Cl.
*H02M 7/162* (2006.01)
*H02J 3/36* (2006.01)

(56) References Cited

U.S. PATENT DOCUMENTS

2006/0043955 A1  3/2006  Hung
2008/0122412 A1  5/2008  Burton
2008/0212342 A1*  9/2008  Karlecik-Maier .............. 363/35
2010/0141222 A1  6/2010  Ouyang

OTHER PUBLICATIONS

Unofficial English translation of Office Action issued in connection with corresponding CN Application No. 201280008254.7 on Jun. 3, 2015.

* cited by examiner

CONTROL ARRANGEMENT AND METHOD FOR REGULATING THE OUTPUT VOLTAGE OF A DC SOURCE POWER CONVERTER CONNECTED TO A MULTI-SOURCE DC SYSTEM

CROSS-REFERENCE TO RELATED APPLICATIONS

This is a national stage application under 35 U.S.C. §371 (c) of prior-filed, co-pending, PCT application serial number PCT/EP2012/052003, filed on Feb. 7, 2012, which claims priority to European patent application serial number 11000984.2, filed on Feb. 8, 2011, the entire contents of which are hereby incorporated by reference.

TECHNICAL FIELD

Embodiments of the present invention relate generally to a converter control arrangement for regulating the output voltage of a dc source power converter connecting an ac system to a multi-source dc system and/or to a method for regulating the output voltage of a dc source power converter connecting an ac system to a multi-source dc system. Embodiments of the present invention are particularly, but not exclusively, suitable for regulating the output voltage of a dc source power converter connecting an ac system, such as an ac electrical power generator, to a multi-source dc system, such as a high-voltage direct current (HVDC) power transmission network to which a plurality of individual ac electrical power generators are connected in parallel. Each ac electrical power generator may be associated with a renewable-energy turbine such as a wind turbine, to enable the generated electrical power to be supplied to, and transmitted via, the HVDC power transmission network.

TECHNICAL BACKGROUND

The use of renewable energy sources to generate electricity for the power network is becoming increasingly common in many countries. It is possible to convert renewable energy such as wind, wave, tidal energy or water current flows into electrical energy by using a turbine to drive the rotor of an alternating current (ac) electrical power generator, either directly or by means of a gearbox. The ac frequency that is developed at the stator terminals of the generator is directly proportional to the speed of rotation of the rotor. The voltage at the generator terminals also varies as a function of speed and, depending on the particular type of generator, on the flux level.

In some circumstances, it can be advantageous to transmit electrical power generated by a renewable energy turbine via a high-voltage direct current (HVDC) power transmission network, as opposed to a more conventional ac power transmission network. A dc source power converter in the form of a generator bridge and operating as an active rectifier connects the ac electrical power generator of the renewable energy turbine to the HVDC power transmission network. The renewable energy turbine and its associated ac electrical power generator and dc source power converter thus operate together as an individual dc source supplying dc electrical power to the HVDC power transmission network. It will be understood that a large number of such dc sources are typically connected in parallel to the HVDC power transmission network to supply the required amount of dc electrical power to the network and ensure stable network operation.

The individual dc sources can operate under voltage control regulation to supply electrical power at a target or reference voltage value $V_{ref}$ to the HVDC power transmission network and/or under current control regulation to supply electrical power at a target or reference current value $I_{ref}$ to the HVDC power transmission network, with a combination of voltage control regulation and current control regulation being more advantageous. During fault conditions, either in the HVDC power transmission network or in one or more of the parallel-connected dc sources, the output voltage at the converter terminals of one or more of the individual dc source power converters or the output current supplied by one or more of the individual dc source power converters can increase to levels that cannot be tolerated by the dc system. This can cause conflicts in the electrical power generated by the multiple parallel-connected dc sources.

There is, therefore, a need for a converter control arrangement and associated control methodology for a dc source power converter which can prevent conflicts in the electrical power generated by multiple dc sources operating in parallel, for example as a result of being parallel-connected to a dc system such as a HVDC power transmission network. More particularly, there is a need for a converter control arrangement and associated control methodology which is capable of providing reliable and effective regulation of the output voltage of a dc source power converter to minimise damage, either arising from excessive output voltage at the converter terminals or from excessive output current, especially during fault conditions.

US 2008/122412 A1 describes with reference to FIG. 4 a voltage regulator, specifically intended for a high-performance integrated circuit such as a microprocessor, which has a loadline with two different loadline resistances (i.e. droop rates). The voltage regulator controls the processor voltage so that its operating point is on a light loadline, with a lower loadline resistance, when the measured current is below a lower processor current level (IccLo) and so that its operating point is on a heavy loadline, with a higher loadline resistance, when the measured current is above the lower processor current level (IccLo). The operating point of the processor is not pre-defined by the voltage regulator and instead moves along the two fixed loadlines illustrated in FIG. 4 according to the load level (i.e. the measured current).

SUMMARY OF THE INVENTION

According to an embodiment of the present invention, there is provided a converter control arrangement for regulating the output voltage of a dc source power converter, the converter control arrangement comprising: —a dynamic droop control device including first and second droop controllers each having an associated droop rate, the droop rate of the second droop controller being greater than the droop rate of the first droop controller; a voltage regulator for regulating the output voltage of the dc source power converter by comparing an output voltage value ($V_{out}$) of the power converter with a target voltage value ($V_{tgt}$), the target voltage value ($V_{tgt}$) being derived by combining a reference voltage value ($V_{ref}$; $V''_{ref}$) and a droop voltage value ($V_{dr}$) provided by the dynamic droop control device, wherein: the first droop controller is operable to control the droop voltage value ($V_{dr}$) provided by the dynamic droop control device when an output current value ($I_{out}$) of the dc source power converter is less than a reference current value ($I_{ref}$) and the second droop controller is operable to control the droop voltage value ($V_{dr}$) provided by the dynamic droop control device when the output current value ($I_{out}$) of the dc source power converter is greater than the reference current value ($I_{ref}$).

Embodiments of the present invention provide an electrical arrangement for electrical power generation comprising at least two dc sources connected in parallel to a dc system and each having a dc source power converter, at least one of the dc source power converters including a converter control arrangement according to an embodiment of the present invention. Typically, each of the dc source power converters includes a converter control arrangement according to an embodiment of the present invention.

According to an embodiment of the present invention, there is provided a method for regulating the output voltage of a dc source power converter including a converter control arrangement comprising a dynamic droop control device including first and second droop controllers each having an associated droop rate, the droop rate of the second droop controller being greater than the droop rate of the first droop controller, the method comprising: comparing an output voltage value ($V_{out}$) of the dc source power converter with a target voltage value ($V_{tgt}$) to enable regulation of the output voltage of the power converter, the target voltage value ($V_{tgt}$) being derived by combining a reference voltage value ($V_{ref}$; $V''_{ref}$) and a droop voltage value ($V_{dr}$) provided by the dynamic droop control device; and comparing an output current value ($I_{out}$) of the dc source power converter with a reference current value ($I_{ref}$), wherein: the droop voltage value ($V_{dr}$) provided by the dynamic droop control device is controlled by the first droop controller when the output current value ($I_{out}$) is less than the reference current value ($I_{ref}$) and the droop voltage value ($V_{dr}$) provided by the dynamic droop control device is controlled by the second droop controller when the output current value ($I_{out}$) is greater than the reference current value ($I_{ref}$).

The reference current value ($I_{ref}$) is the desired output current value ($I_{out}$) of the dc source power converter and defines, in combination with the reference voltage value ($V_{ref}$; $V''_{ref}$), a target operating point.

The converter control arrangement and method according to embodiments of the present invention enable the output voltage of a dc source power converter to be regulated effectively, particularly during fault conditions, based on a combination of voltage control regulation and current control regulation, the latter being achieved through a comparison of the output current value ($I_{out}$) of the dc source power converter with the reference current value ($I_{ref}$).

The dynamic droop control device is operative only when the when the measured output current value ($I_{out}$) differs from the desired reference current value ($I_{ref}$), in other words when the measured load current differs from the target load current. Accordingly, the droop characteristic provided by the dynamic droop control device has an effect only during dynamic operating conditions (i.e. when the output current value ($I_{out}$) differs from the reference current value ($I_{ref}$) and, hence, when the dc source power converter operates away from the target operating point as determined by the reference current value ($I_{ref}$) and the reference voltage value ($V_{ref}$; $V''_{ref}$)) but not during steady-state operating conditions (i.e. when the output current value ($I_{out}$) is equal to the reference current value ($I_{ref}$) and, hence, when the dc source power converter operates at the target operating point as determined by the reference current value ($I_{ref}$) and the reference voltage value ($V_{ref}$; $V''_{ref}$)).

In practice the load condition in a dc system is constantly changing which means that the output current value ($I_{out}$) may not always be equal to the pre-defined desired reference current value ($I_{ref}$). Embodiments of the present invention introduce a dynamic droop characteristic only when the output current value ($I_{out}$) differs from the reference current value ($I_{ref}$), based on the difference between the measured output current value ($I_{out}$) and the reference current value ($I_{ref}$). In these circumstances, the operating point moves away from the target operating point along a dynamic droop line provided by the first or second droop controller. When operating under such dynamic conditions, the converter control arrangement regulates the output voltage of the dc source power converter to restore the operating point to the target operating point.

In particular, when the output current value ($I_{out}$) is less than the desired reference current value ($I_{ref}$), which normally occurs when the output voltage value ($V_{out}$) of the dc source power converter is greater than the reference voltage value, the first droop controller, with its lower droop rate, operates to minimise the rise in the output voltage value ($V_{out}$) at the converter terminals of the dc source power converter. The lower droop rate of the first droop controller thus provides a near constant voltage control characteristic. On the other hand, when the output current value ($I_{out}$) is greater than the desired reference current value ($I_{ref}$), which normally occurs when the output voltage value ($V_{out}$) of the dc source power converter is less than the reference voltage value, the second droop controller, with its higher droop rate, operates to minimise the rise in the output current value ($I_{out}$). The higher droop rate of the second droop controller thus provides a near constant current control characteristic.

The near constant voltage control characteristic provided by the first droop controller and the near constant current control characteristic provided by the second droop controller are particularly suitable for HVDC system control.

The dc source power converter normally connects an ac system to a dc system to enable dc electrical power to be supplied to the dc system. The ac system and associated dc source power converter together form an individual dc source. The ac system typically comprises an ac electrical power generator, for example associated with a renewable energy turbine. In such circumstances, the dc system normally comprises a HVDC system such as a HVDC electrical power transmission network. As indicated above, a plurality of individual dc sources are normally connected in parallel to a dc system such as a HVDC electrical power transmission network to form an electrical arrangement according to an embodiment of the present invention.

The voltage regulator may include a voltage comparator for comparing the output voltage value ($V_{out}$) of the dc source power converter with the target voltage value ($V_{tgt}$) and may include a voltage controller for controlling the operation of the dc source power converter in order to regulate the output voltage value ($V_{out}$) to achieve the desired output voltage value ($V_{out}$), namely a value consistent with the target voltage value ($V_{tgt}$). The voltage controller typically outputs a control signal (Ctr_out) to control the operation of the dc source power converter.

The converter control arrangement may include a voltage summer for summing the reference voltage value ($V_{ref}$; $V''_{ref}$) and the droop voltage value ($V_{dr}$) to thereby derive the target voltage value ($V_{tgt}$). The reference voltage value ($V_{ref}$; $V''_{ref}$) is generally the value desired for the target voltage value ($V_{tgt}$), and therefore the output voltage value ($V_{out}$) of the dc source power converter, when the output current value ($I_{out}$) of the dc source power converter is equal to the desired reference current value ($I_{ref}$). As indicated above, the reference current value ($I_{ref}$) and the reference voltage value ($V_{ref}$; $V''_{ref}$) together define the target operating point of the dc source power converter.

The first and second droop controllers may have fixed droop rates. As indicated above, the droop rate of the second droop controller is greater than the droop rate of the first droop controller. Generally, the droop rates are selected to provide an appropriate level of sensitivity for efficient operation of the converter control arrangement.

The dynamic droop control device may include a current comparator for comparing the output current value ($I_{out}$) of the dc source power converter with the reference current value ($I_{ref}$) to generate a current error value signal ($I_{err}$) for the first and second droop controllers.

In some embodiments, the converter control arrangement may include a summer which is operable to sum the reference voltage value ($V_{ref}$) and a system droop characteristic to provide a modified reference voltage value ($V''_{ref}$) for combination with the droop voltage value ($V_{dr}$). The target voltage value ($V_{tgt}$) is derived in such embodiments by combining the modified reference voltage value ($V''_{ref}$) with the droop voltage value ($V_{dr}$) provided by the dynamic droop control device.

The dynamic droop control device may include a third droop controller which is operable to generate the system droop characteristic, normally as a function of the reference current value ($I_{ref}$). The third droop controller typically has a fixed droop rate which contributes to the determination of the system droop characteristic.

The modified reference voltage value ($V''_{ref}$), which is derived based on the system droop characteristic generated by the third droop controller and which has a larger magnitude than the dc system voltage value ($V_{sys}$), compensates for voltage drop within the power transmission line that normally connects the dc source power converter to the dc system, which may be a HVDC power transmission network. Such voltage drop typically occurs due to electrical resistance within the power transmission line.

The operation of the dc source power converter is normally adjusted as part of the control method according to an embodiment of the present invention in order to enable regulation of the output voltage value ($V_{out}$), namely to a value consistent with the target voltage value ($V_{tgt}$).

The control method may comprise comparing the output current value ($I_{out}$) of the dc source power converter with the reference current value ($I_{ref}$) to generate a current error value signal ($I_{err}$) for the first and second droop controllers.

The control method may comprise multiplying the current error value signal ($I_{err}$) by the first and second droop rates of each of the first and second droop controllers to provide respective first and second droop voltage signals. The method may comprise detecting which one of the first and second droop voltage signals has the minimum value and setting the droop voltage value ($V_{dr}$) to be equal to said minimum value. The first droop voltage signal always has the minimum value when the output current value ($I_{out}$) is less than the reference current value ($I_{ref}$) such that the droop voltage value ($V_{dr}$) provided by the dynamic droop control device is controlled by the first droop controller. The second droop voltage signal always has the minimum value when the output current value ($I_{out}$) is greater than the reference current value ($I_{ref}$) such that the droop voltage value ($V_{dr}$) provided by the dynamic droop control device is controlled by the second droop controller.

Alternative embodiments of the control method may comprise multiplying the current error value signal ($I_{err}$) by the droop rate of only the appropriate one of the first and second droop controllers depending on whether the current error value signal ($I_{err}$) is positive or negative. In particular, when the current error value signal ($I_{err}$) is positive, indicating that the output current value ($I_{out}$) is less than the reference current value ($I_{ref}$), the current error value signal ($I_{err}$) may be multiplied by the droop rate of the first droop controller to ensure that the droop voltage value ($V_{dr}$) provided by the dynamic droop control device is controlled by the first droop controller. On the other hand, when the current error value signal ($I_{err}$) is negative, indicating that the output current value ($I_{out}$) is greater than the reference current value ($I_{ref}$), the current error value signal ($I_{err}$) may be multiplied by the higher droop rate of the second droop controller to ensure that the droop voltage value ($V_{dr}$) provided by the dynamic droop control device is controlled by the second droop controller.

The step of combining the reference voltage value and the droop voltage value ($V_{dr}$) typically comprises summing the respective voltage values.

In some embodiments, the control method may comprise combining the reference voltage value ($V_{ref}$) with a system droop characteristic to provide a modified reference voltage value ($V''_{ref}$) for combination with the droop voltage value ($V_{dr}$) to enable derivation of the target voltage value ($V_{tgt}$). The step of combining the reference voltage value ($V_{ref}$) with the system droop characteristic may comprise summing the reference voltage value ($V_{ref}$) and the system droop characteristic. The system droop characteristic is typically a function of both the reference current value ($I_{ref}$) and a droop rate determined by a third droop controller.

DRAWINGS

DETAILED DESCRIPTION OF EMBODIMENTS OF THE INVENTION

Embodiments of the present invention will now be described by way of example only and with reference to the accompanying drawings.

Figure 1A:
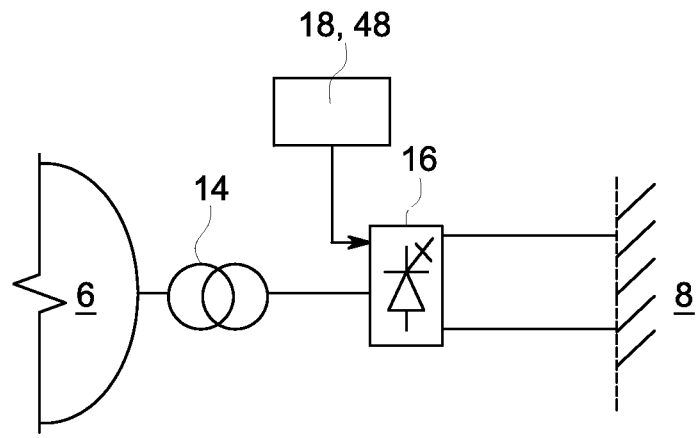
FIG. 1A is a schematic illustration of one of a plurality of dc sources connected in parallel to a dc system and including a dc source power converter.

FIG. 1A illustrates an electrical arrangement comprising an ac system 6 connected to a dc system 8. The ac system 6 is connected to the dc system 8 by a step-up voltage transformer 14 and a dc source power converter 16 operating as an active rectifier. The ac system 6, step-up transformer 14 and dc source power converter 16 operate collectively as a dc source which supplies dc electrical power to the dc system.

Figure 1B:
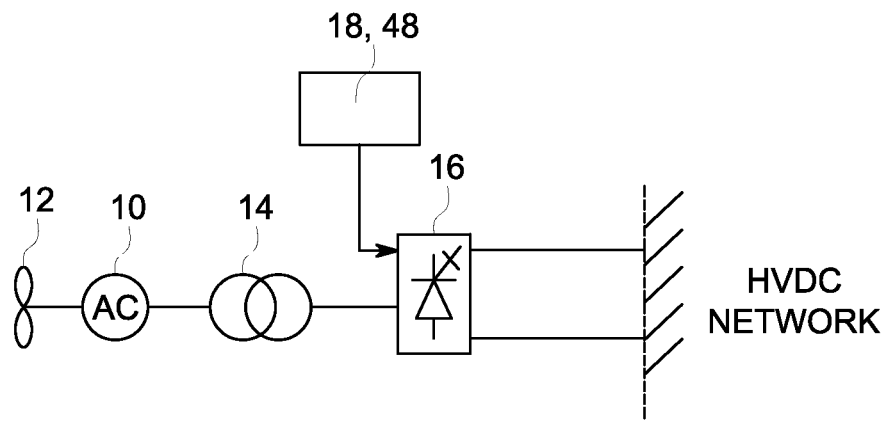
FIG. 1B is a schematic illustration of one of a plurality of ac electrical power generators connected in parallel to a HVDC power transmission network and including a dc source power converter.

Referring now to FIG. 1B, in one implementation of the electrical arrangement, the ac system comprises an alternating current (ac) electrical power generator 10 which is driven by a wind turbine 12 and the dc system 8 comprises a high-voltage direct current (FTVDC) power transmission network. In this particular electrical arrangement, the dc source thus consists of the ac electrical power generator 10 and its associated wind turbine 12, the step-up transformer 14 and the dc source power converter 16 which operates as a generator bridge. It will be appreciated that a typical wind farm comprises a large number of such dc sources and these are normally connected in parallel to the HVDC network.

As discussed earlier in this specification, conflicts in the electrical power generated by parallel-connected dc sources can occur, for example during fault conditions. In order to reduce the potentially damaging effects that can arise as a result of such conflicts, embodiments of the present invention provide a converter control arrangement 18, 48 which can be used to regulate the output voltage of a dc source power converter such as the dc source power converters 16 that form part of the electrical arrangements described above with reference to FIGS. 1a and 1b. When a plurality of dc sources, each comprising a dc source power converter 16, are connected in parallel, it is feasible that only one of the dc source power converters 16 may include a converter control arrangement 18, 48 in accordance with embodiments of the present invention to regulate its output voltage. Typically, however, the dc source power converter 16 of each dc source includes a converter control arrangement 18, 48 in accordance with embodiments of the present invention to regulate its output voltage.

Figure 2:
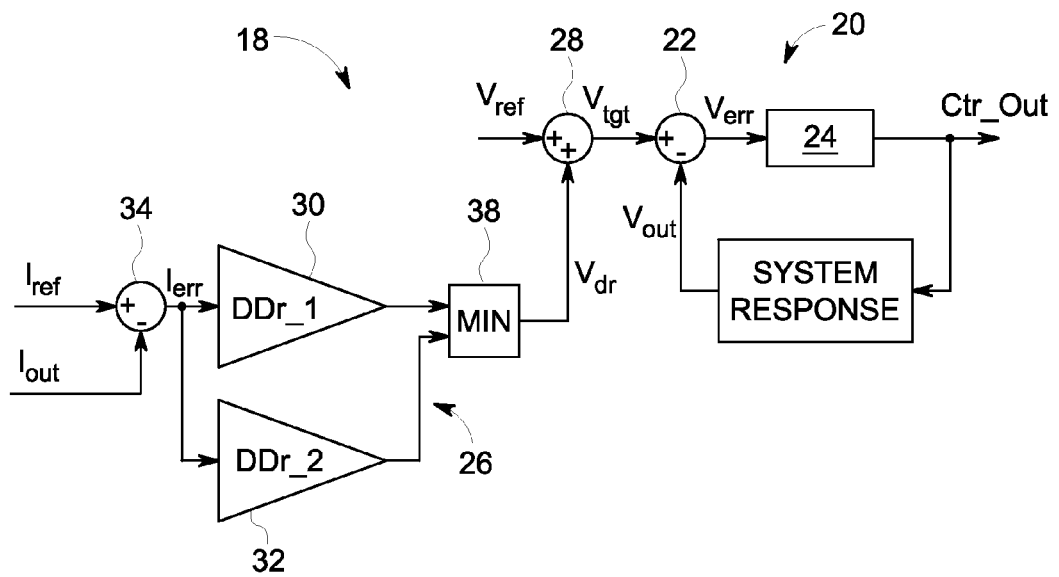
FIG. 2 is a schematic illustration of a converter control arrangement according to a first embodiment of the present invention which is suitable for controlling the dc source power converter of FIGS. 1A and 1B.

A schematic illustration of a converter control arrangement 18 according to one embodiment of the present invention is illustrated in FIG. 2. The converter control arrangement 18 comprises a voltage regulator 20 which includes a voltage comparator 22 and a voltage controller 24. The voltage comparator 22 subtracts a measured output voltage value $V_{out}$ of the dc source power converter 16 from a desired target voltage value $V_{tgt}$. If there is any deviation or error between these two voltage values in the form of a voltage error value signal $V_{err}$, this voltage error value signal $V_{err}$ is input into the voltage controller 24. The voltage controller 24 then outputs a control signal Ctr_out to actively control the operation of the dc source power converter 16 in order to regulate the output voltage value $V_{out}$ so that it is consistent with the target voltage value $V_{tgt}$.

The converter control arrangement 18 includes a dynamic droop control device 26 which provides a droop voltage value $V_{dr}$ and a voltage summer 28 which sums the droop voltage value $V_{dr}$ and a reference voltage value $V_{ref}$ which is the desired output voltage value $V_{out}$ from the dc source power converter 16 when the output current value Iout is equal to the desired reference current value $I_{ref}$. It will, therefore, be appreciated that the target voltage value $V_{tgt}$ is derived by summing together, at the voltage summer 28, the reference voltage value $V_{ref}$ and the droop voltage value $V_{dr}$ provided by the dynamic droop control device 26.

The dynamic droop control device 26 includes first and second droop controllers 30, 32. Each droop controller 30, 32 has a fixed droop rate and the droop rate of the second droop controller 32 is greater than the droop rate of the first droop controller 30. The dynamic droop control device 26 includes a current comparator 34 which subtracts a measured output current value $I_{out}$ of the dc source power converter 16 from a desired reference current value $I_{ref}$ which is representative of the desired output current of the dc source power converter 16. The output of the current comparator 34, resulting from this subtraction, is a current error value signal $I_{err}$.

In accordance with the present invention, the droop voltage value $V_{dr}$ is controlled by the first droop controller 30, with its lower droop rate, when the measured output current value $I_{out}$ is less than the desired reference current value $I_{ref}$, in other words when the current error value signal $I_{err}$ is positive. On the other hand, when the measured output current value $I_{out}$ is greater than the desired reference current value $I_{ref}$, in other words when the current error value signal $I_{err}$ is negative, the droop voltage value $V_{dr}$ is controlled by the second droop controller 32 with its higher droop rate. The significance of the 'dual control' that is provided by the dynamic droop control device 26, dependent upon the result of the comparison of the measured output current value $I_{out}$ of the dc source power converter 16 with the desired reference current value $I_{ref}$ in the current comparator 34, will now be explained with reference to FIG. 3 which is a plot of voltage against electrical current for the dc source power converter 16 controlled by the converter control arrangement 18 illustrated in FIG. 2.

When the dc source power converter 16 is operating normally and not experiencing a fault condition (i.e. steady-state operation), it will be understood that the measured output current value $I_{out}$ will normally be equal to the reference current value $I_{ref}$. In these circumstances, the comparison of the output current value $I_{out}$ with the reference current value $I_{ref}$ that is carried out by the current comparator 34 will yield a zero error, in other words the current error value signal $I_{err}$ will be zero. Accordingly, since there will be no input to the first and second droop controllers 30, 32, the droop voltage value $V_{dr}$ will also be zero such that the target voltage value $V_{tgt}$ provided to the voltage comparator 22 will be equal to the reference voltage value $V_{ref}$. Assuming that the voltage controller 24 is adequately regulating the output voltage value $V_{out}$ of the dc source power converter 16 so that it is consistent with the target voltage value $V_{tgt}$ (and hence the reference voltage value $V_{ref}$), the dc source power converter 16 will operate normally, at the predefined target operating point 36 shown in FIG. 3. It will, thus, be understood that the reference current value $I_{ref}$ and the reference voltage value $V_{ref}$ together define the target operating point 36 of the dc source power converter 16.

When the dc source power converter 16 experiences dynamic operation, which may be due to a fault condition, the measured output current value $I_{out}$ will not normally be equal to the reference current value $I_{ref}$. The measured output current value $I_{out}$ may be greater than or less than the reference current value $I_{ref}$, for example depending on the nature of the fault condition. In these circumstances, the comparison of the output current value $I_{out}$ with the reference current value $I_{ref}$ that is carried out by the current comparator 34 will yield a non-zero error such that a positive or negative current error value signal $I_{err}$ is supplied to the first and second droop controllers 30, 32. Accordingly, the reference voltage value $V_{ref}$ is combined at the voltage summer 28 with the droop voltage value $V_{dr}$ to provide the desired target voltage value $V_{tgt}$ for the dc source power converter 16.

In the illustrated embodiment of the converter control arrangement 18, the current error value signal $I_{err}$, as determined by the current comparator 34, is input into the first and second droop controllers 30, 32 and multiplied by the respective droop rates to provide first and second droop voltage signals. The dynamic droop control device 26 includes a control block 38 which determines which of the first and second droop voltage signals has the minimum value and then sets the droop voltage value $V_{dr}$ to be equal to the droop voltage signal having the minimum value.

When the measured output current value $I_{out}$ of the dc source power converter 16 is less than the desired reference current value $I_{ref}$, which may for example indicate that part of the electrical power supplied by the dc source power converter 16 is being rejected, the resultant current error value signal $I_{err}$ as determined by the current comparator 34, will be positive. In these circumstances, the minimum droop voltage signal will always be the first droop voltage signal that is provided by the first droop controller 30. This ensures that the droop voltage value $V_{dr}$ is controlled by the first droop controller 30 when the output current value $I_{out}$ is less than the reference current value $I_{ref}$.

When the measured output current value $I_{out}$ of the dc source power converter 16 is greater than the desired reference current value $I_{ref}$, the resultant current error value signal $I_{err}$, as determined by the current comparator 34, will be negative. In these circumstances, the minimum droop voltage signal will always be the second droop voltage signal that is provided by the second droop controller 32. This ensures that the droop voltage value $V_{dr}$ is controlled by the second droop controller 32 when the output current value $I_{out}$ is greater than the reference current value $I_{ref}$.

Figure 3:
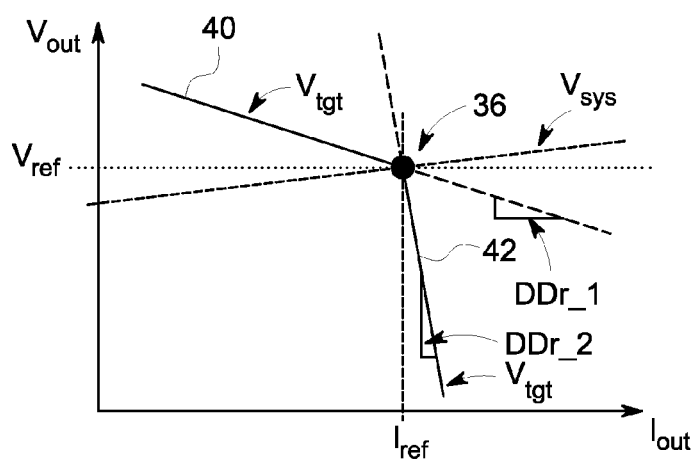
FIG. 3 is a graphic representation of voltage against electrical current for a dc source power converter controlled by the converter control arrangement of FIG. 2.

The effect on the target voltage value $V_{tgt}$, as a result of modification of the reference voltage value $V_{ref}$ by the droop voltage value $V_{dr}$ at the voltage summer 28, can be clearly seen in FIG. 3. When the output current value $I_{out}$ is less than the reference current value $I_{ref}$, the target voltage value is on slope (i.e. droop line) 40, with its lower droop rate DDr_1, above the operating point 36. The rise in the output voltage value $V_{out}$ at the converter terminals of the dc source power converter 16 is, thus, limited to an acceptable level as the output current value $I_{out}$ decreases. Conversely, when the output current value $I_{out}$ is greater than the reference current value $I_{ref}$, the target voltage value is on slope (i.e. droop line) 42, with its higher droop rate DDr_2, below the operating point 36. Accordingly, the rise in the output current value $I_{out}$ is limited to an acceptable level in circumstances where the output voltage value $V_{out}$ of the dc source power converter 16 is less than the reference voltage value $V_{ref}$.

The droop rates of the first and second droop controllers 30, 32 are selected to provide the dynamic droop control device 26 with an appropriate level of sensitivity for controlling the converter control arrangement 18 and, hence, the dc source power converter 16. It will be appreciated that the droop rate of the second droop controller 32 in particular needs to be sufficiently high that the rise in the output current value $I_{out}$ is minimised in circumstances where the output voltage value $V_{out}$ falls below the reference voltage value $V_{ref}$. The steady state system fault current can, thus, be minimised so that it is close to the reference current value $I_{ref}$.

Figure 4:
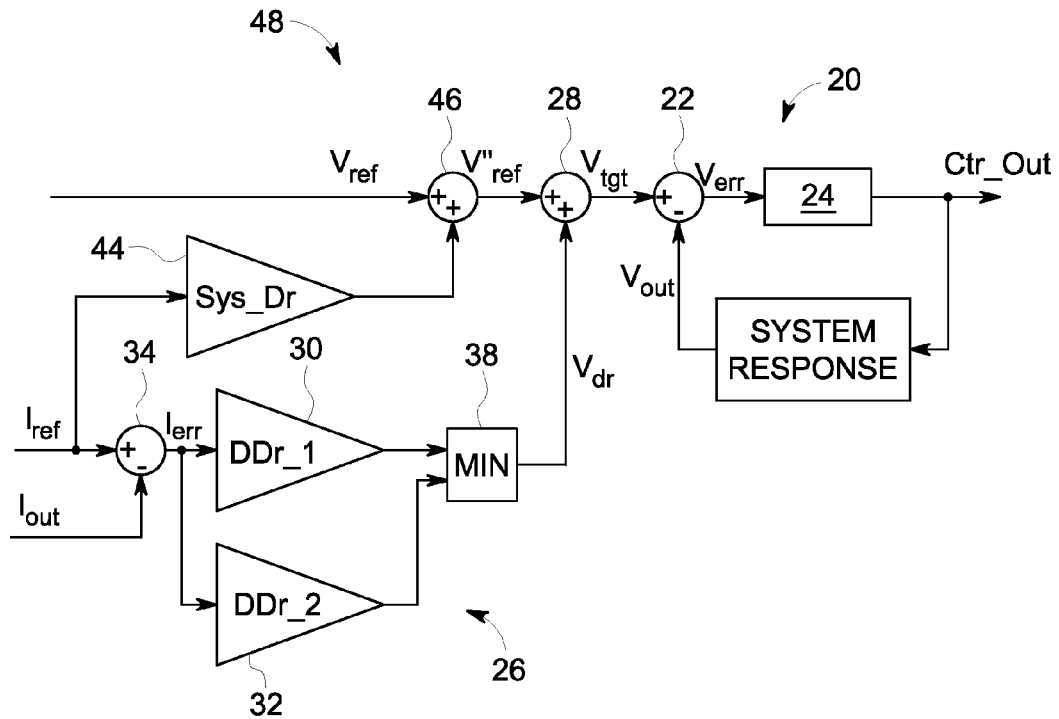
FIG. 4 is a schematic illustration of a converter control arrangement according to a second embodiment of the present invention which is suitable for controlling the dc source power converter of FIGS. 1A and 1B.

Referring now to FIG. 4, there is shown a schematic illustration of a converter control arrangement 48 according to an embodiment of the present invention which can be used to regulate the output voltage of a dc source power converter such as the dc source power converters 16 that form part of the electrical arrangements described above with reference to FIGS. 1*a* and 1*b*. The converter control arrangement 48 of FIG. 4 is similar to the arrangement illustrated in FIG. 2, and corresponding reference numerals and notation will, therefore, be used to identify corresponding features.

In addition to the first and second droop controllers 30, 32, the dynamic droop control device 26 includes a third droop controller 44 having a fixed droop rate. The third droop controller 44 generates a system droop characteristic which is a function of the reference current value $I_{ref}$. More particularly, the reference current value $I_{ref}$ is multiplied by the fixed droop rate of the third droop controller 44 to provide the system droop characteristic. The converter control arrangement 48 includes a summer 46 at which the reference voltage value $V_{ref}$ is modified, and more specifically increased, by the system droop characteristic to provide a modified reference voltage value $V''_{ref}$. It is this modified reference voltage value $V''_{ref}$ that is provided to the voltage summer 28 such that, in this embodiment, the target voltage value $V_{tgt}$ is derived based on the combination of the modified reference voltage value $V''_{ref}$ with the droop voltage value $V_{dr}$ (which may, of course, be equal to zero, for example under non-fault conditions, when the measured output current value $I_{out}$ is equal to the reference current value $I_{ref}$).

Figure 5:
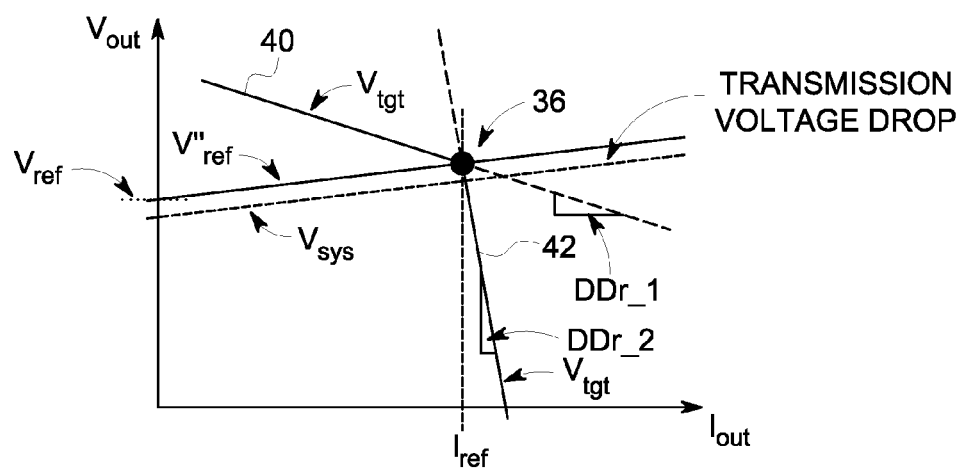
FIG. 5 is a graphic representation of voltage against electrical current for a dc source power converter controlled by the converter control arrangement of FIG. 4.

It will be appreciated that the modified reference voltage value $V''_{ref}$, which is derived from the system droop characteristic generated by the third droop controller 44, compensates for dc system regulation and is greater than the dc system voltage value $V_{sys}$, as is clearly shown in FIG. 5. The larger magnitude of the modified reference voltage value $V''_{ref}$ than the dc system voltage value $V_{sys}$ advantageously compensates for voltage drop in the power transmission line connecting the dc source power converter 16 to the HVDC power transmission network. The dc system voltage $V_{sys}$ is determined by a power converter operating as an active inverter (i.e. a network bridge) and forming part of the HVDC power transmission network or other dc system 8. The droop rate of the third droop controller 44 normally corresponds to the droop rate of the active inverter, as shown in FIG. 5.

In all other respects, the operation of the converter control arrangement 48 described and illustrated with reference to FIGS. 4 and 5 is the same as the operation of the converter control arrangement 18 described and illustrated above with reference to FIGS. 2 and 3.

Although embodiments of the invention have been described in the preceding paragraphs, it should be understood that various modifications may be made to those embodiments without departing from the scope of the following claims.

What is claimed is:

1. A converter control arrangement for regulating the output voltage of a dc source power converter, the converter control arrangement comprising:
    a dynamic droop control device comprising a first droop controller and a second droop controller, each of the first droop controller and the second droop controller comprising an associated droop rate, the associated droop rate of the second droop controller being greater than the associated droop rate of the first droop controller;
    a voltage regulator configured to regulate the output voltage of the dc source power converter based on a comparison of an output voltage value of the dc source power converter with a target voltage value, the target voltage value being derived by combining a reference voltage value and a droop voltage value provided by the dynamic droop control device,
    the first droop controller being configured to control the droop voltage value provided by the dynamic droop control device when an output current value of the dc source power converter is less than a reference current value, and the second droop controller being configured to control the droop voltage value provided by the dynamic droop control device when the output current value of the dc source power converter is greater than the reference current value,
    the dynamic droop control device further comprising a current comparator configured to compare the output current value of the dc source power converter with the reference current value to generate a current error value signal, and
    each of the first and second droop controllers being coupled to the current comparator and configured to receive the current error value signal as an input, the first and second droop controllers configured to output a first droop voltage signal and a second droop voltage signal respectively, wherein the reference current value is the desired output current value of the dc source power converter and defines, in combination with the reference voltage value, a target operating point.

2. The converter control arrangement according to claim 1, wherein the voltage regulator comprises a voltage comparator configured to compare the output voltage value with the target voltage value, and a voltage controller configured to control the operation of the dc source power converter to regulate the output voltage value.

3. The converter control arrangement according to claim 1, wherein the first droop controller and the second droop controller comprise fixed droop rates.

4. The converter control arrangement according to claim 1, further comprising a summer configured to sum the reference voltage value and a system droop characteristic to provide a modified reference voltage value for combination with the droop voltage value to enable derivation of the target voltage value.

5. The converter control arrangement according to claim 4, wherein the dynamic droop control device further comprises a third droop controller configured to generate the system droop characteristic as a function of the reference current value.

6. The converter control arrangement according to claim 5, wherein the third droop controller comprises a fixed droop rate.

7. A method for regulating the output voltage of a dc source power converter comprising a converter control arrangement comprising a dynamic droop control device comprising a first droop controller and a second droop controller, each of the first droop controller and the second droop controller comprising an associated droop rate, the associated droop rate of the second droop controller being greater than the associated droop rate of the first droop controller, the method comprising:

comparing an output voltage value of the dc source power converter with a target voltage value to enable regulation of the output voltage of the dc source power converter, the target voltage value being derived by combining a reference voltage value and a droop voltage value provided by the dynamic droop control device;

comparing an output current value of the dc source power converter with a reference current value thereby generating a current error value signal; and inputting the current error value signal to the first droop controller and the second droop controller;

wherein the droop voltage value—provided by the dynamic droop control device is controlled by the first droop controller when the output current value is less than the reference current value, and the droop voltage value provided by the dynamic droop control device is controlled by the second droop controller when the output current value is greater than the reference current value, wherein the reference current value is the desired output current value of the dc source power converter and defines, in combination with the reference voltage value, a target operating point.

8. The method according to claim 7, wherein the method further comprises controlling the operation of the dc source power converter to regulate the output voltage value to a value consistent with the target voltage value.

9. The method according to claim 7, wherein combining the reference voltage value and the droop voltage value comprises summing the respective voltage values.

10. The method according to claim 7, further comprising combining the reference voltage value with a system droop characteristic to provide a modified reference voltage value for combination with the droop voltage value to enable derivation of the target voltage value.

11. The method according to claim 10, wherein—combining the reference voltage value with the system droop characteristic comprises summing the reference voltage value and the system droop characteristic.

12. The method according to claim 10, wherein the dynamic droop control device further comprises a third droop controller, and the system droop characteristic is a function of the reference current value and a droop rate determined by the third droop controller.

13. The method according to claim 12, wherein each of the first droop controller, the second droop controller, and the third droop controller comprises a fixed droop rate.

* * * * *